United States Patent

Crimi

[11] 4,045,146
[45] Aug. 30, 1977

[54] HELICOPTER ROTOR BLADE

[75] Inventor: Peter Crimi, West Boxford, Mass.

[73] Assignee: Avco Corporation, Wilmington, Mass.

[21] Appl. No.: 687,359

[22] Filed: May 17, 1976

[51] Int. Cl.$^2$ .............................. B64C 27/46
[52] U.S. Cl. ........................ 416/1; 416/91; 416/231 R
[58] Field of Search ............ 416/91, 231, 228, 1, 416/20 R, 20 A, 92; 415/DIG. 1

[56] References Cited

U.S. PATENT DOCUMENTS

| | | | |
|---|---|---|---|
| 2,156,133 | 4/1939 | Troller | 416/91 |
| 2,408,788 | 10/1946 | Ludington et al. | 416/91 X |
| 2,516,489 | 7/1950 | Stalker | 416/91 X |
| 2,759,548 | 8/1956 | Yuan et al. | 416/91 X |
| 3,100,539 | 8/1963 | Hulbert | 416/91 |
| 3,109,499 | 11/1963 | Klein | 416/91 |
| 3,319,593 | 5/1967 | Papst | 416/91 X |
| 3,841,587 | 10/1974 | Freed | 416/91 X |
| 3,936,013 | 2/1976 | Yuan | 416/228 X |

FOREIGN PATENT DOCUMENTS 341,717  11/1959  Switzerland .................. 416/91

Primary Examiner—Everette A. Powell, Jr.
Attorney, Agent, or Firm—Abraham Ogman

[57] ABSTRACT

Torsional oscillations of helicopter rotor blades are reduced with stall, otherwise leading to such torsional oscillations, precluded consistent with allowable high angle of attack, by sucking air from the boundary layer on the upper surface of the blade near the leading edge thereof at a radial location of 80–90% maximum radius thereof and pumping the sucked boundary layer air, utilizing the inherent centrifugal pumping capability of the blade by establishing an exhaust of the centrifugal pumping passage within the blade which allows adequate pumping for the torsional oscillation reduction purpose consistent with the required rate flow of air.

10 Claims, 4 Drawing Figures

HELICOPTER ROTOR BLADE

BACKGROUND OF THE INVENTION

The present invention relates to rotor blades for helicopters and other aircraft employing rotary wings and is characterized by reduction of torsional oscillations of such blades, increase of allowable angle of attack and hence increased aircraft speed and gross weight, low costs and minimal impact on other aspects of blade and rotor design while measurably improving aircraft performance.

Helicopters are currently limited in forward speed and gross weight by the occurrence of unacceptably large blade torsional oscillations due to the periodic stalling of each blade on the retreating side of the rotor disc.

It is an important object of this invention to substantially reduce the amplitude of such torsional oscillations.

It is a further object of the invention to allow an increased angle of attack as associated with increased aircraft forward speed and/or gross weight consistent with the preceding object.

It is a further object of the invention to reduce the level of high frequency vibration of helicopter rotor blades consistent with one or more of the preceding objects.

It is a further object of the invention to implement one or more of the foregoing objects at low cost and with minimal impact on other aspects of rotor blade design while measurably improving aircraft performance.

It is a further object of the invention to dissipate blade tip vortices consistent with one or more of the preceding objects.

SUMMARY OF THE INVENTION

In accordance with the invention, stall is prevented over a relatively small outward segment of the blade, to thereby reduce the amplitude of torsional oscillations and allow a greater angle of attack, by bleeding boundary layer air into the blade from an upper surface portion thereof near the leading edge and over approximately 10% of the blade span, preferably located beyond 80% of maximum wing radius. The location near the leading edge is from zero to 5% chord. The air brought in is centrifugally pumped through the interior of the blade to an exhaust location selected to provide a static pressure at least as low as the pressure in the region in which the air is drawn. In accordance with a first preferred embodiment of the invention, such exhaust is behind the blade tip within the core of the tip vortex formed a small distance after the trailing edge of the blade near the tip. In accordance with an alternative preferred embodiment of the invention, the exhaust is established at the upper surface of the blade near the tip at the same chordwise location as the intake surface. In either case, the exhaust is substantially radially outward of the inlet. In either case, the required intervening cross section of passage area from inlet to exhaust is well within the dimensional envelope afforded by standard blade design. Other exhaust locations besides the two described above may be used, the essential requirement being that the static pressure is sufficiently low with respect to the static pressure of intake. The exhaust should be located as close to the tip as possible, to extract the maximum from the blade pumping capacity.

Other objects, features and advantages of the invention will be apparent from the following detailed description of the invention, taken in connection with the accompanying drawing, in which,

DETAILED DESCRIPTION OF PREFERRED EMBODIMENTS

Figure 1:
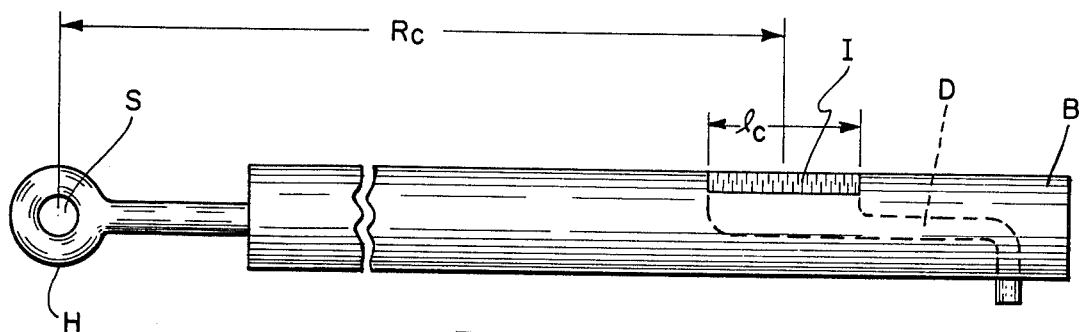
FIG. 1 is a schematic sketch of a blade of a rotary wing aircraft indicating the location of control segments according to the first embodiment of the invention.
Figure 2:
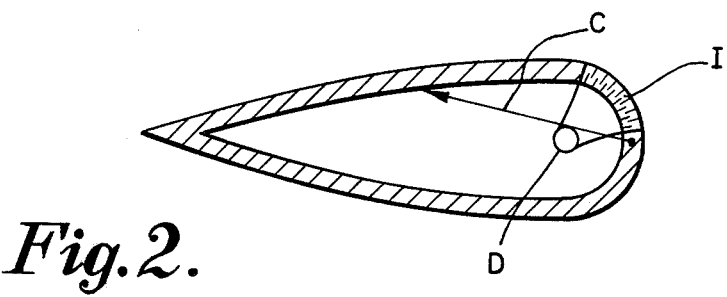
FIGS. 2, 3 and 4 are crossections of the blade, FIG. 2 being located at the inlet for boundary layer suction and FIGS. 3 and 4 at the exhaust, the former in connection with the first embodiment of the invention relating to exhaust location and the latter in accordance with the second embodiment of the invention relating to exhaust location.

Referring now to FIG. 1, there is shown a helicopter rotor blade B mounted on a shaft s via a hub H and comprising as a boundary layer control segment a sucking inlet region I located with its center at a radial location on the blade designated $R_c$ over a control length $l_c$ sucking air into an internal duct D of the blade and exhausting it out of the location indicated at $E_1$. FIG. 2 indicates a cross section of the blade at the inlet region showing that the inlet I is a perforated or porous segment of the blade wall with its design, construction and material being as commonly employed for boundary layer control by suction. Baffling or piping may be provided within the hollow blade B to comprise a discrete duct D or, alternatively, without any special baffling or piping, the entire interior of the blade may comprise the duct D. To avoid pressure losses, guide vanes may be used and sudden changes in areas should be avoided.

Figure 3:
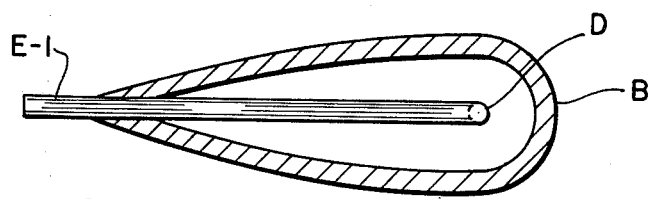

FIG. 3 shows the exhaust of the centrifugal pumping passage wherein the exhaust end of the duct D is indicated at E-1 and trails behind the blade tip T to be immersed in the tip vortex. The tip vortex region provides a sufficiently low static pressure to establish a requisite pressure differential from the inlet I for effective centrifugal pumping over a passage area within the dimensional envelope provided by the blade B.

Referring back to FIG. 2, the term chordwise location is illustrated by C and it can be seen that the inlet I is located at a 0-10%, chordwise location.

Figure 4:
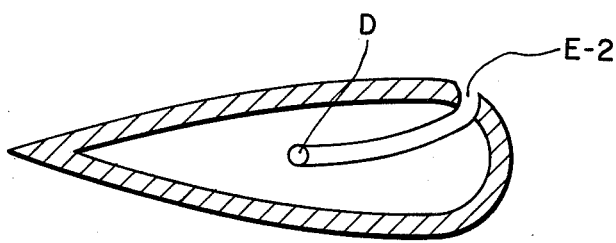

Referring now to FIG. 4, another cross section view of the blade at the location for the exhaust duct D, it is seen that the exhaust E-2 of the duct of this embodiment is a slot located at a chordwise location of the upper surface of the blade corresponding to the inlet chordwise location, i.e., at approximately 3 to 5% of chord aft of the leading edge.

Concerning the duct construction, the blade skin may be used for upper and lower duct surfaces. The spar commonly forms the leading edge, so some change in spar design will generally be required to provide the inlet and ducting passages as indicated above.

It is preferred and distinctly advantageous in accordance with the invention that the blade be constructed such that the ratio ($L_c R_c$) is 0.1 to 0.2 while the inlet I occupies 2-5% of chord and, as stated above, is located on the upper surface extending aft from the leading edge of the blade. The following non-limiting example illustrates practice of the invention.

An airfoil section typical of rotary wing aircraft blades with a thickness ratio of 0.09 (maximum thickness over blade's chord length) was tested at a chordal Reynolds Number of $1.15 \times 10^6$ with suction over the surface area near the leading edge comprising 2.75% of chord, The suction rate required to just prevent stall is such as to allow a stall angle increase from about 10° to about 16° when utilizing the ducted pumping of this example.

The total required suction rate is given by $$Q = C_q U Cl_C$$

where $C_q$ is suction coefficient, U is free stream speed, C is blade chord and $l_c$ is as defined above. And in a typical class for a blade of a Sikorsky Aircraft CH-34 helicopter, $C_q$ is 0.0016, $l_c$ is 1.4 ft., U is 334 ft.,/sec., Q is found to be 1.01 cubic feet per second and for one dimensional radial flow in a centrifugal force field, the exhaust velocity is determined to be 328 ft. per second from which the minimum duct area required is 0.00308 sq. ft. giving a diameter of 0.75 inch for a circular duct equivalent, well within the cross-section envelope of the rotor blade.

As another example, with $l_c$ increased from 1.4 ft. to 4.2 ft., to give correspondingly more stall control and more reduction in vibration amplitude, it is found that a duct area of only 0.755 ft.$^2$ or about 5% of the blade cross-sectional area, is required.

Usage of the inherent centrifugal pumping of the blade provides an advantage, compared to separately powered pumping, of avoiding vulnerability to pump failure and is also much simpler, less expensive, and requiring relatively minor blade design changes compared to a system using a separate pump.

Where the exhaust location as shown in connection with FIGS. 1 and 3 is used, sufficient air is injected into the tip vortex core to partially dissipate the tip vortex, resulting in reduced high-frequency blade bending vibrations and reduced rotor noise, consistent with maintaining the pressure differential for boundary layer suction at the inlet I. Where the exhaust location of FIG. 4 is selected, the air injected into the boundary layer helps prevent stall and reduce the drag over that segment of the blade.

It will be apparent to those skilled in the art, once given the benefit of the foregoing disclosure that other variations can be made within the scope of the invention described herein. It is therefore intended that the foregoing description shall be read as illustrative and not in a limiting sense.

What is claimed is:

1. Means for reducing torsional oscillations of a blade of a rotary wing aircraft where the flow of air, due to the motion of the aircraft, is essentially in the plane of the rotary wing comprising intake means for sucking air from a boundary layer region located on the upper blade surface and essentially solely at the leading edge within the outer half of the span of the wing and exhaust means for exhausting the air into a region of lower static pressure than the suction region, the air being removed from suction region to exhaust solely by passing centrifugal pumping through wing rotation, said intake means being solely in the 80-90% of maximum wing radius region.

2. Blade means of a rotary wing aircraft in accordance with claim 1 wherein the intake of boundary layer air is along the blade upper surface region from the leading edge to 5% chord.

3. Blade means of rotary wing aircraft in accordance with claim 2 wherein the exhaust is into the core of the blade's tip vortex.

4. Blade means of a rotary wing aircraft in accordance with claim 2 wherein the exhaust is essentially at the rotary wing blade tip at the same chordwise location as the inlet.

5. Blade means of a rotary wing aircraft in accordance with claim 2 wherein $l_c R_c$ is 0.1 to 0.2 where $l_c$ is controlled blade length and $R_c$ is mean control radius.

6. A method of reducing torsional oscillations on helicopter rotor blades comprising the step of sucking air from a boundary layer region located on the upper blade surface and essentially solely at the leading edge within the outer half of the span of the wing and exhausting the air into a region of lower static pressure than the suction region, the air being moved from suction region to exhaust solely by passive centrifugal pumping through wing rotation.

7. A method in accordance with claim 6 wherein the intake of boundary layer air is essentially solely in the 80-90% of maximum wing radius region and along the blade upper surface region from the leading edge 5% chord.

8. A method in accordance with claim 7 wherein the exhaust is into the core of the blade's tip vortex.

9. A method in accordance with claim 7 wherein the exhaust is essentially at the rotary wing blade tip at the same chordwise location as the inlet.

10. A method in accordance with claim 7 wherein $l_c R_c$ is 0.1 to 0.2 wherein $l_c$ is controlled blade length and $R_c$ is mean control radius.

* * * * *

UNITED STATES PATENT AND TRADEMARK OFFICE
CERTIFICATE OF CORRECTION

PATENT NO. : 4,045,146
DATED : August 30, 1977
INVENTOR(S) : P. Crimi

It is certified that error appears in the above–identified patent and that said Letters Patent are hereby corrected as shown below:

Column 3, line 16, please change "class" to ---case---.

Column 4, line 8, please change "passing" to ---passive---.

Column 4, line 26, please change "$l_c R_c$" to ---$\frac{l_c}{R_c}$---.

Column 4, line 50, please change "$l_c R_c$" to ---$\frac{l_c}{R_c}$---.

Signed and Sealed this

Twenty-second Day of November 1977

[SEAL]

Attest:

RUTH C. MASON
Attesting Officer

LUTRELLE F. PARKER
Acting Commissioner of Patents and Trademarks